United States Patent
Bennett et al.

(10) Patent No.: US 9,383,740 B2
(45) Date of Patent: Jul. 5, 2016

(54) CONTROL OF SAFETY CRITICAL OPERATIONS

(75) Inventors: Simon Grant Bennett, Walderslade Woods (GB); Nicholas Andrew Belcher, Whitstable (GB); David Parker, Sittingbourne (GB); Kevin Challis, Rainham (GB); David Christopher Watkins, Gillingham (GB); Gary Robert Watkins, Sheerness (GB)

(73) Assignee: BAE SYSTEMS PLC, London (GB)

( * ) Notice: Subject to any disclaimer, the term of this patent is extended or adjusted under 35 U.S.C. 154(b) by 969 days.

(21) Appl. No.: 13/578,747

(22) PCT Filed: Feb. 14, 2011

(86) PCT No.: PCT/GB2011/050272
§ 371 (c)(1),
(2), (4) Date: Aug. 13, 2012

(87) PCT Pub. No.: WO2011/098832
PCT Pub. Date: Aug. 18, 2011

(65) Prior Publication Data
US 2012/0303145 A1 Nov. 29, 2012

(30) Foreign Application Priority Data

Feb. 13, 2010 (EP) .................................. 10250250
Feb. 13, 2010 (GB) .................................. 1002495.8

(51) Int. Cl.
*G05D 1/00* (2006.01)
*G05B 19/042* (2006.01)

(52) U.S. Cl.
CPC ................. *G05B 19/0425* (2013.01)

(58) Field of Classification Search
CPC ............... G05B 19/0425; B60R 25/00; G02N 11/0807; G07C 5/008; G07C 9/00309; G07C 2009/00793
USPC .............................................. 701/1, 2; 700/90
See application file for complete search history.

(56) References Cited

U.S. PATENT DOCUMENTS

| 7,363,129 B1 * | 4/2008 | Barnicle ................ G08C 17/02 701/1 |
| 8,031,060 B2 * | 10/2011 | Hoffberg ............... G05B 15/02 340/426.15 |
| 2003/0033036 A1 | 2/2003 | Wendorff |

(Continued)

FOREIGN PATENT DOCUMENTS

| DE | 30 30 000 A1 | 2/1982 |
| DE | 10 2004 029 487 A1 | 1/2006 |

(Continued)

OTHER PUBLICATIONS

International Preliminary Report on Patentability and Written Opinion, dated Aug. 23, 2012 from related International Application No. PCT/GB2011/050272.

(Continued)

*Primary Examiner* — Shardul Patel
(74) *Attorney, Agent, or Firm* — Scully, Scott, Murphy & Presser, P.C.

(57) ABSTRACT

A system wherein control of a safety-critical system operation is effected by sending a plurality of keywords via a low integrity communication path.

16 Claims, 6 Drawing Sheets

(56) References Cited

U.S. PATENT DOCUMENTS

| | | | | |
|---|---|---|---|---|
| 2003/0093187 | A1* | 5/2003 | Walker | B64C 13/20 |
| | | | | 701/1 |
| 2008/0121097 | A1* | 5/2008 | Rudakevych | F41A 19/58 |
| | | | | 89/28.05 |
| 2012/0053759 | A1* | 3/2012 | Lowrey | G01C 21/26 |
| | | | | 701/2 |
| 2012/0267472 | A1* | 10/2012 | Pratzovnick | B64C 39/024 |
| | | | | 244/13 |
| 2012/0303145 | A1* | 11/2012 | Bennett | G05B 19/0425 |
| | | | | 700/90 |

FOREIGN PATENT DOCUMENTS

| | | |
|---|---|---|
| JP | 2003-152692 A | 5/2003 |
| WO | WO 2009/007206 A1 | 1/2009 |

OTHER PUBLICATIONS

International Search Report dated Apr. 29, 2011 issued in PCT/GB2011/050272.
Extended European Search Report dated Jul. 14, 2010 issued in EP 10250250.7.
UK Search Report dated May 21, 2010 issued in GB1002495.8.

* cited by examiner

Traditional SMS Architecture

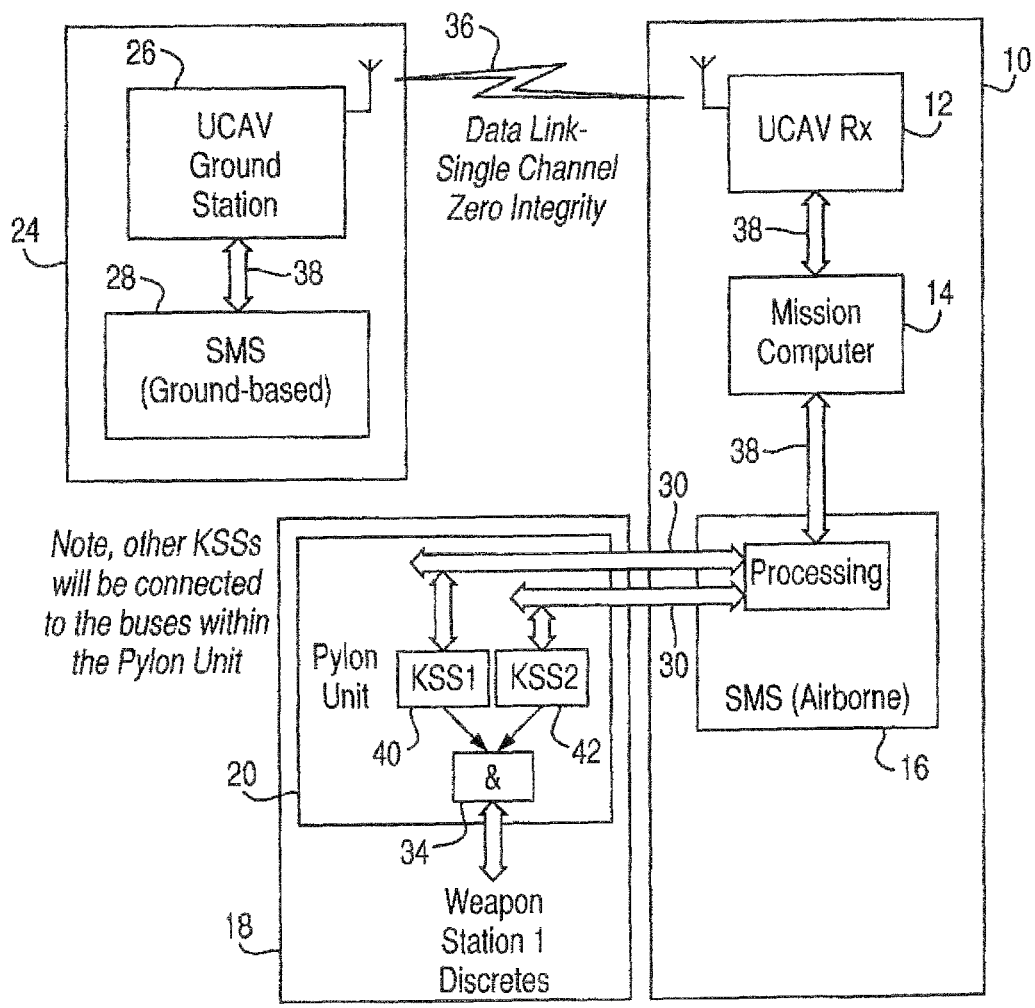

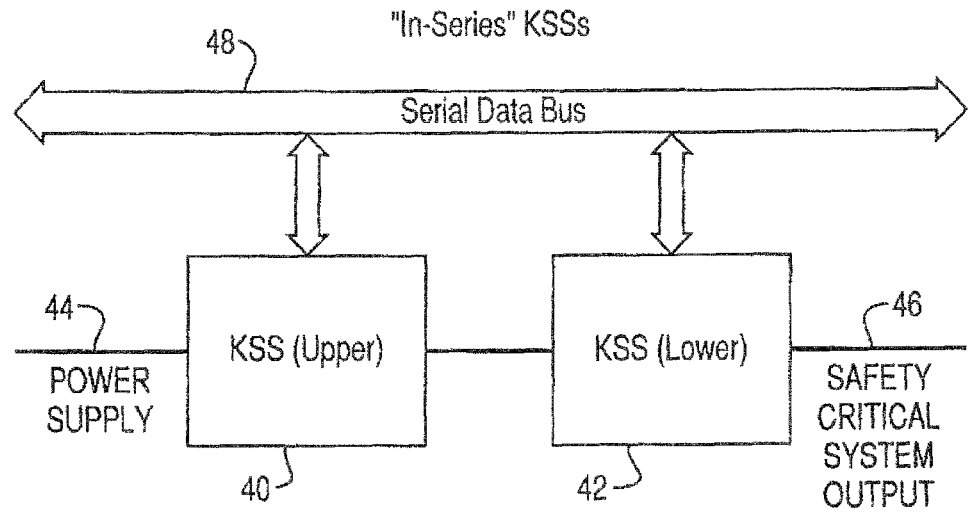
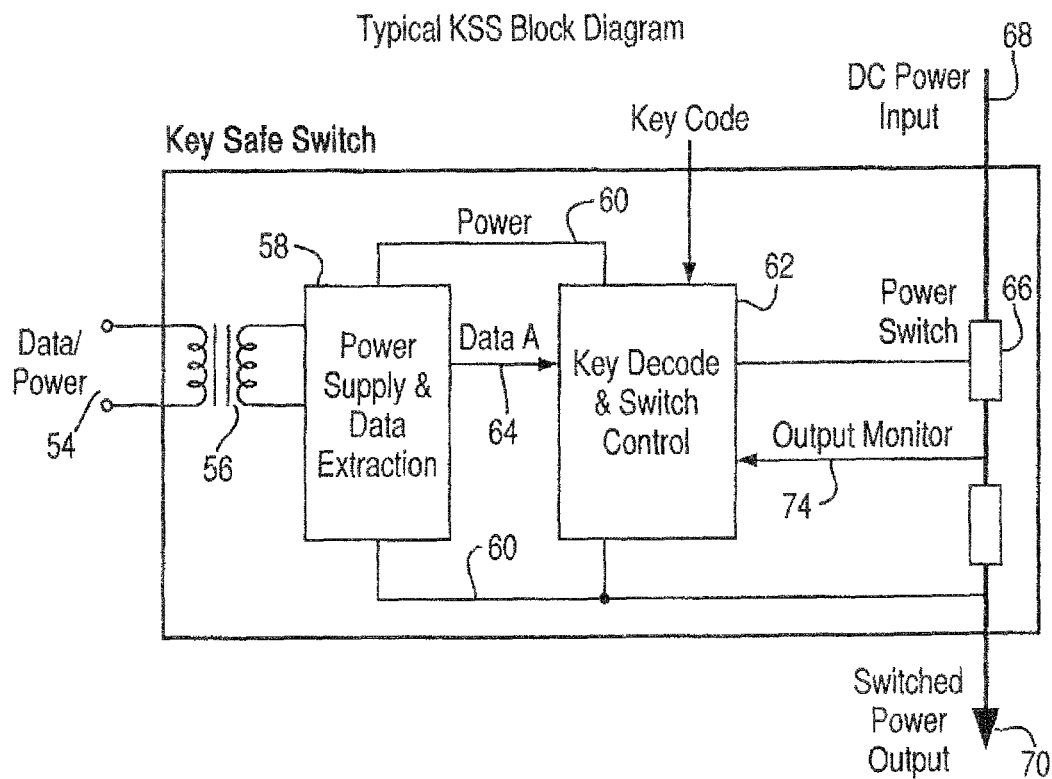

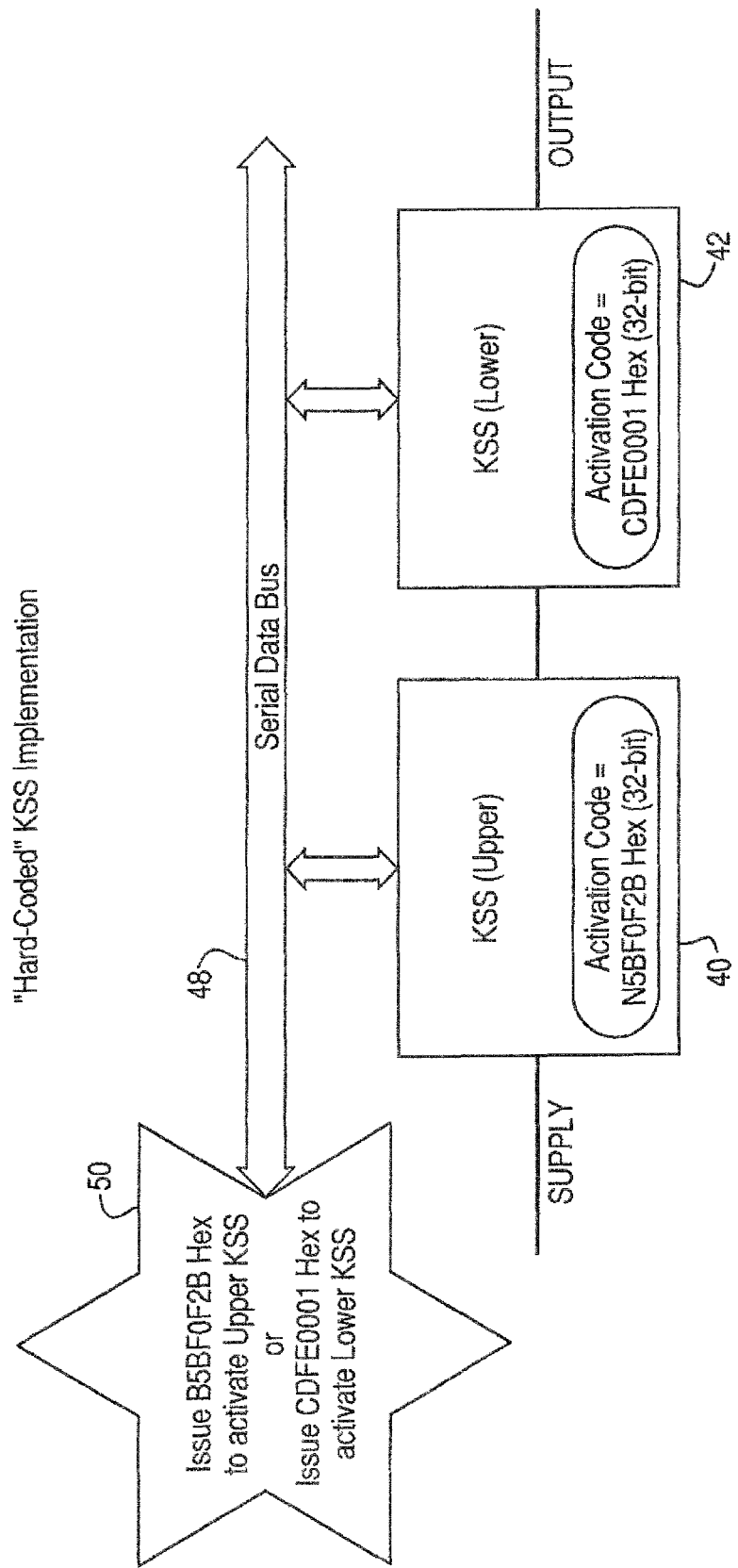

"Addressable" KSS implementation

KSS implementation with predetermined sequencing

CONTROL OF SAFETY CRITICAL OPERATIONS

This invention relates to systems configured to effect safety-critical operations, and the control thereof. By "safety critical operation" we mean an operation which would or foreseeably could have irreversible physical consequences. A non-limiting example is the release of a store (e.g. a bomb, missile or auxiliary fuel tank) from an aircraft.

Whilst the invention is particularly relevant to a system in a vehicle (by which we mean any moveable platform, whether on or beneath the ground, in or on water, in the air or in space) it may also find application in stationary apparatus, for example a land-based missile launcher, a security gate or other access-control apparatus (the irreversible change here being the breach of security implicit in permitting access), process plant, power generation plant or railway signalling.

Generally, in known systems, a safety critical operation is performed only if a verified command is received, and in the absence of a verified command the safety critical operation is not performed. Such systems do not require self correction of command signals because it is required that the system maintains its default "no operation" condition unless a verified command is received. This is in contrast to "availability driven systems" where a "no operation" condition is not permitted. These systems typically employ self correction of data to ensure continuation of an operation when required.

Conventionally, safety-critical systems achieve high integrity or availability by duplicating (and sometimes triplicating or even quadruplicating) hardware elements and the communication paths between such elements, and by requiring that executive signals be delivered via different paths and agree with each other, or at least that a majority of such signals agree with each other.

This invention is based on the recognition that, so far as such signals are concerned, it matters not by how many paths the signals are delivered. What is important is that the executive signal is correctly received and verified. In the present invention this can be done via a single transmission path.

The present invention provides a system comprising: an operative portion for performing a safety critical operation, a command portion remote from the operative portion for controlling performance of the safety critical operation, and low integrity transmission means for transmitting a control command from the command portion to the operative portion, wherein the control command comprises a plurality of keywords generated in a high integrity control command generation part of the command portion which are outputted only in response to a correct command from an operator, and the operative portion comprises a plurality of high integrity key safe switches which operate to compare the keywords received from the command portion via the low integrity transmission means, the performance of the safety critical operation being effected only in the event of a correct comparison by the key safe switches.

Thus, in a first aspect, the invention provides a system configured to effect control of a safety-critical operation by sending a plurality of keywords via a low integrity transmission means.

In particular the low-integrity transmission means may include a single or common transmission path. Thereby the number of transmission channels in the system (normally 2, 3 or 4) can be reduced to one for most or all of its length. This can enable a significant reduction in system complexity and cost.

The system may comprise a plurality of switches each selectively responsive to said keywords, operation of at least a majority of the switches being required to effect said control.

The switches may be arranged in series, for example with respect to a power supply or other executive signal for the said system operation.

There may be means for causing the switches to operate in a predetermined sequence. For example, a said keyword may be supplied to one said switch via a logic gate to which an output from another said switch is supplied.

A keyword may be sent to a said switch via a serial data bus. The same data bus may be used for all the keywords.

The system may be configured to provide local power to a said switch as part of a data signal containing the keyword.

The present invention also provides a system comprising: an operative portion for performing a safety critical operation, a command portion remote from the operative portion for controlling performance of the safety critical operation, and low integrity transmission means for transmitting a control command from the command portion to the operative portion, wherein the control command comprises a plurality of decrypt keys generated in a high integrity control command generation part of the command portion which are outputted only in response to a correct command from an operator, and the operative portion comprises a high integrity store for storing a plurality of keywords generated only on receipt of the decrypt keys received from the command portion via the low integrity transmission means and a plurality of high integrity key safe switches which operate to compare the generated keywords, the performance of the safety critical operation being effected only in the event of a correct comparison by the key safe switches.

This second aspect of the invention differs from the first aspect in that decrypt keys are sent from the command portion to the operative portion rather than the high integrity keywords themselves. This arrangement may be preferred if the bandwidth of the low integrity transmission means is relatively low, since the decrypt keys require less bandwidth for transmission. However, the operative portion must then contain a further high integrity portion for storing the keywords and therefore there may be additional hardware costs.

Each switch may be configured to respond to a different said keyword.

Further, the invention is particularly applicable to the control of safety critical operations in apparatus located remotely from a control station, for example in an unmanned aerial vehicle (UAV) or other vehicle. Thus the system may be a stores management system.

Thus in another aspect the invention provides a unmanned aerial vehicle comprising: an operative portion for performing a safety critical operation in response to a control command received from a command portion remote from the vehicle via low integrity transmission means, wherein the control command comprises a plurality of keywords generated in a high integrity control command generation part of the command portion which are outputted only in response to a correct command from an operator, and the operative portion comprises a plurality of high integrity key safe switches which operate to compare the keywords received from the command portion via the low integrity transmission means, the performance of the safety critical operation being effected only in the event of a correct comparison by the key safe switches.

In a further aspect it provides a controller for a remotely-operable apparatus configured to execute a safety-critical operation and including means for transmitting to the apparatus via a single transmission path an instruction or authorisation for said operation comprising a plurality of keywords.

The invention will now be described merely by way of example with reference to the accompanying drawings, wherein;

FIG. 2 shows a safety-critical system according to the invention in a UCAV;

FIG. 3 shows part of the system of FIG. 2;

FIGS. 4 and 5 show implementation of two embodiments of the invention using the structure of FIG. 3;

FIG. 6 shows part of the structure of FIG. 4 in more detail; and

Figure 1:
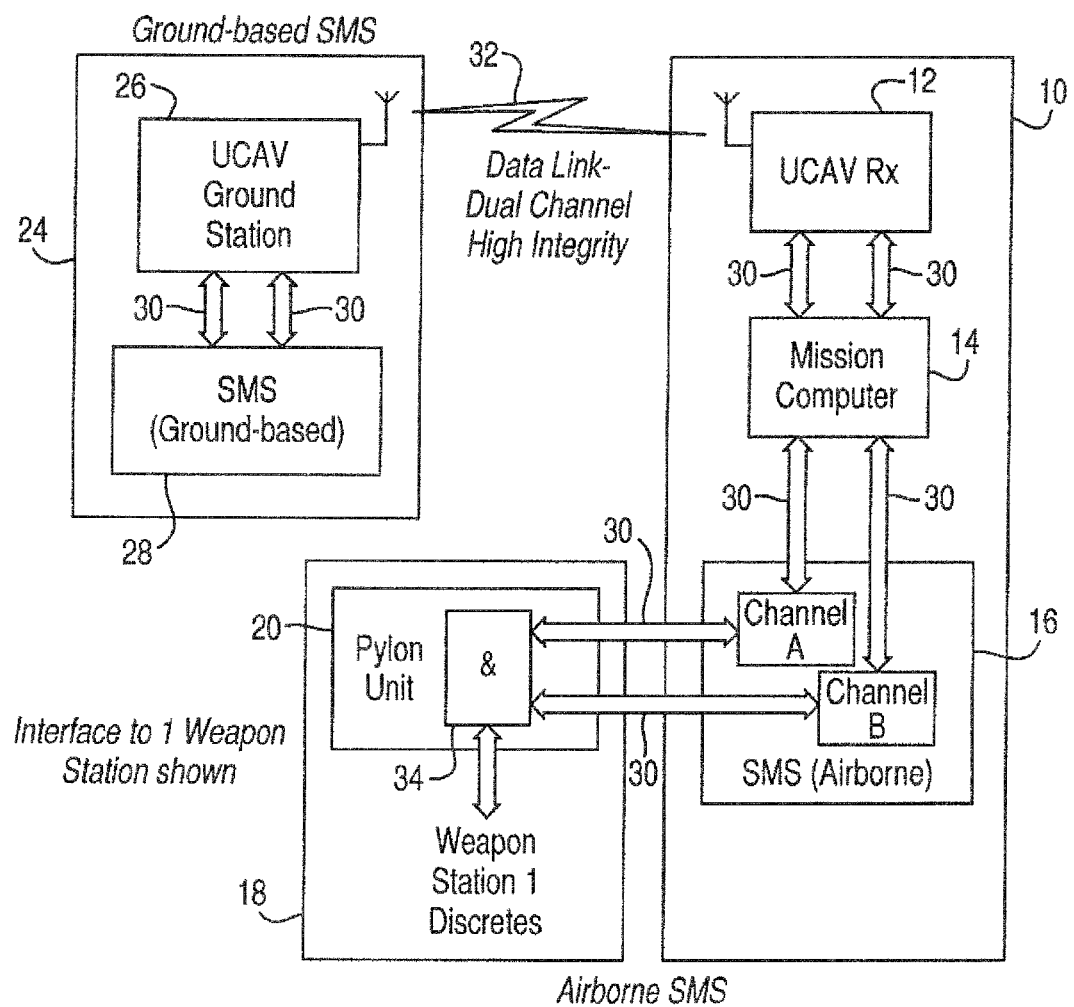
FIG. 1 shows a conventional safety-critical system in an unmanned combat aerial vehicle "(UCAV)"

Referring to FIG. 1, a conventional UCAV 10 comprises, so far as relevant here, a radio receiver 12 and a mission computer 14 which operates an airborne portion 16 of a stores management system (SMS). The SMS controls the operation and release of one or more stores (weapons) 18 mounted on an external pylon unit 20 of the UCAV. In the following description the store is assumed to be a releasable weapon, but it could equally be some other releasable device.

The UCAV is controlled by an operator at a ground station 24 which includes a transmitter 26, and in particular a ground based controller portion 28 of the SMS. The uncommanded release of any store by the UCAV would be a serious matter, and so the control of the SMS is effected by a safety-critical system in which each of the sub-units 12, 14, 16, 20 contain duplicated functional elements, and each is connected to the others by duplex communication paths 30, including a dual channel radio link 32 between the transmitter 12 and the receiver 26.

The communication paths are consolidated into a single path only at the interface between the pylon 20 and the store. Generally, SMS applications require a number of outputs (some safety critical) to be activated in a logical sequence to achieve a weapon release.

A typical release sequence of a store is as follows:—
Weapon Selection Phase
 Mission Computer requests SMS to select weapon.
 Airborne SMS selects weapon and returns selection to Mission Computer.
 SMS switches non-safety critical power to store (generally implemented by single power switch or relay drive in Pylon Unit).
 Weapon performs Built-in-Test.
Weapon Arming Phase
 Ground Station Operator issues "weapon arming" command
 SMS energies fire supplies (following relevant interlock checks).
 SMS energises safety critical power to store (safety critical SMS output, generally implemented by two "in-series" upper/lower power switches).
Weapon Release Phase
 Ground Station Operator sanctions final release and issues "weapon release" command
 SMS energises Release Consent (safety critical SMS output, generally implemented by two "in-series" upper/lower power switches).
 SMS energises "Fire" output to Suspension & Release Equipment (safety critical SMS output, generally implemented by two "in-series" upper/lower power switches).

Thus in operation of the FIG. 1 system, a safety-critical command is duplicated and sent via both channels 30, 32 from the SMS controller 28. If (but only if) both commands are well-received at a comparator 34 within the pylon 20 is the command executed. With this architecture, the entire system from the ground operator's inputs through to the pylon outputs to the store 18 has to be developed to the highest hardware and software integrity standards, e.g. DEF-STAN-00-55/56 Safety Integrity Level 4 or equivalent, with all that implies for complexity and cost.

FIG. 2 shows a system according to the invention which is similarly resistant to uncommanded release of the store, but which is much simpler than the system of FIG. 1. Parts already described have the same reference numerals as in FIG. 1.

In this embodiment, the ground-based SMS portion 28, the UCAV ground station 26, the UCAV receiver 12, the mission computer 14 and the airborne SMS portion 16 are configured and arranged to communicate with each other via only a single low integrity communication path 36, 38. The pylon unit contains two key-safe switches (KSS) 40, 42, each of which only changes to an active (closed) state when prompted with a respective unique keyword.

The outputs of the switches 40, 42 are compared in a comparator 34 as in FIG. 1, and if they agree the comparator issues a safety-critical command to the store 18.

The keywords are stored securely in a high integrity part of the ground-based portion of the SMS 28 and are generated for transmission only in response to procedurally-correct commands from the ground station operator. The storage, selection, retrieval and release elements of the ground-based SMS 28 are configured to safety-critical (high integrity or SIL4) standards, but the remainder of it together with the other elements of the system with the exception of the switch modules 40, 42 need have only lower integrity. The airborne portion of the SMS 16 is shown as providing separate communication paths 30 to each switch 40, 42, but it is possible to send the keywords to the switches via a common serial bus. This is especially convenient if there are more than two keysafe switches in the pylon unit. For example, each weapon may have an arming switch and a release switch, and indeed there probably will be more than one pylon. Thus there can be a significant number of key-safe switches in the SMS, each with its own unique password communicated to it over a common bus. Keywords for switches or operations which are not safety critical can be stored in the airborne SMS 16 rather than in the ground-based SMS, thereby reducing the amount of data to be sent through the single communications channel.

In this embodiment the system integrity level requirements would be as follows:

| System element(s) | Integrity Level |
| --- | --- |
| 1) Ground-based SMS (only the elements responsible for selection and retrieval of KSS codes) | DEF-STAN-00-55/56 SIL4 (or equivalent) |
| 2) KSS Modules Remainder of SMS (Ground-based & airborne) | DEF-STAN-00-55/56 SIL2 (or equivalent) |

In an alternative embodiment, all keywords for safety critical SMS outputs are held in the airborne SMS 16, as well as the keywords for non-safety critical outputs. The keywords for safety critical outputs however are held in encrypted form. Only the decrypt keys are held in the ground-based SMS 28. In operation the decrypt keys for safety-critical operations such as arming and release are sent by the ground-based SMS 28, and the keywords are decrypted in the airborne SMS 16. They are then applied to the switches 40, 42 as already described. The decrypt keys of course are sent only when commanded by the ground station operator, and thus until then the airborne SMS does not hold all the data necessary to effect release of the store. This embodiment requires certain aspects of the airborne SMS (e.g. control and erasure of the decrypt keys) to be of a high integrity level, but has the advantage of reduced data transfer from the ground-based SMS 28.

In this embodiment, the required integrity levels are;

| System element(s) | Integrity Level |
|---|---|
| 1) Ground-based SMS (only the elements responsible for selection and retrieval of KSS codes) | DEF-STAN-00-55/56 SIL4 (or equivalent) |
| 2) KSS Modules | |
| 3) Airborne SMS (only the elements associated with implementation of the "decrypt key"). | |
| Remainder of SMS (Ground-based & airborne) | DEF-STAN-00-55/56 SIL2 (or equivalent) |

In both embodiments the reduction in the integrity level of the majority of the SMS, coupled with the single-channel design of the system, can yield significant cost savings in the system design, development and subsequent manufacture. However, the concept still permits a reasoned safety case to be constructed (including consideration of a "logical sequence" of events to effect a release), to support the eventual certification of the system.

FIG. 3 illustrates that the comparator function 34 can be achieved simply by connecting the switches 40, 42 in series with respect to a quantity to be controlled. Here, that quantity is a main power supply 44 which when the switches 40, 42 are closed is delivered at 46 (e.g. to the store release mechanism) as a safety critical system output. Also illustrated is the common serial data bus 48.

In FIG. 4 there is shown an implementation of the FIG. 3 embodiment. Activation keywords 50 issued by the ground based SMS 28 are delivered to the bus 48 and then to the switches 40, 42, each of which is hard (read-only) coded to respond to its respective keyword. Each switch also has a hard-coded deactivation keyword, for use if weapon release is aborted.

Each switch 40, 42 contains a processor for key comparison, which may be for example a dedicated microprocessor, programmable logic device or fixed mask device. The choice of device will depend on the particular application, especially operating temperature range and power requirements. Hard-coding of activation and deactivation keywords may be implemented by mechanical (e.g. DIL) switches, hard-wired links, internal or external memory devices or within a data register or permanent memory of the microprocessor.

The data bus 48 (which may be a general purpose serial data bus such as RS422 or USB) can be arranged to provide a local power supply to the switches as part of the data signal containing the keywords. Then, if no serial data is supplied to a particular switch, it will not be powered and will remain in a safe state.

As a further safety feature, signal isolation may be employed on the data bus inputs to:
Prevent an external failure mode of a serial data bus resulting in an inadvertent switch operation.
Provide a high degree of electromagnetic noise immunity.
Maintain complete electrical isolation between control buses.

An advantage of the FIG. 4 embodiment is that the switches connected to the common data bus do not need to be individually addressable, because each is actuated by a unique keyword. However, a disadvantage is that the switches are not interchangeable or replaceable without reprogramming the ground-based SMS 28 because each has its own code. This disadvantage can be eliminated by the embodiment of FIG. 5.

Figure 7:
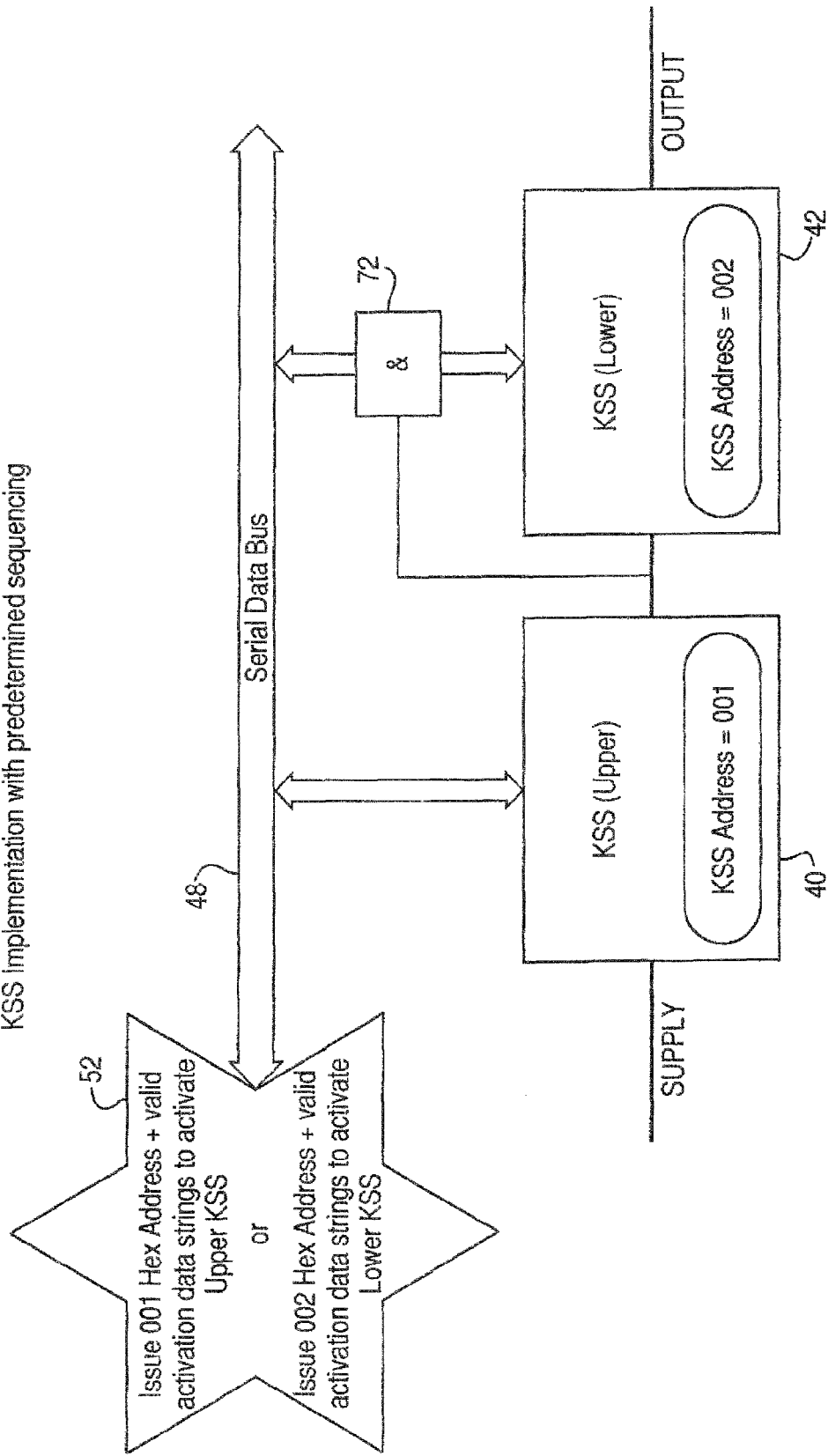
FIG. 7 shows modification to the embodiment of FIG. 5.

In this embodiment, each switch 40, 42 etc is uniquely addressable. If a switch is to be actuated, the ground-based SMS issues two (or more) respective long digital data strings 52 as keywords, together with the switch address. The addressed switch receives the keywords and compares them. If the comparison is valid, the switch is activated. The procedure is then repeated for other switches, as required. The correct sequential operation of the switches can be included as a further safety interlock, for example as shown in FIG. 7 by supplying the data signal to the second switch 42 and similarly to subsequent switches (if present) via a respective AND gate 72 to which the output of the preceding switch 40 is also applied; this feature may also be included in the other embodiments.

Figure 5:
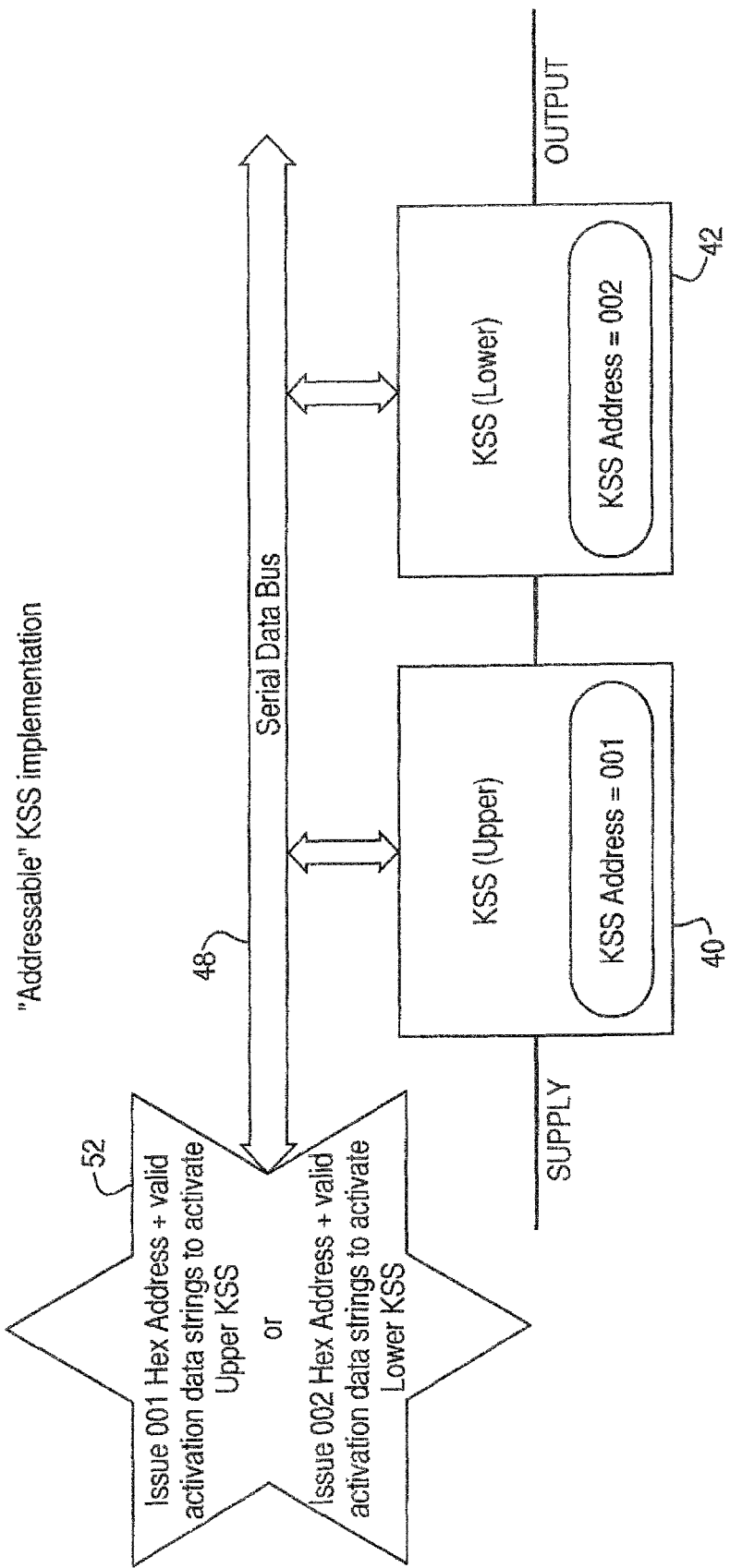

It will be appreciated that in the FIG. 5 embodiment, the actuation keywords do not need to be programmed into the switches, but only their respective addresses. This can be achieved by a separate addressing scheme, or each switch can be programmed with an address. Encryption can be employed as in the FIG. 4 embodiment, the encrypted passwords for each switch being held in the airborne SMS.

FIG. 6 shows one of the switches 40, 42 of FIG. 4 in more detail. A combined data and power signal is received at 54 from the bus 48. The signal preferably is a differential drive signal, with the data encoded using a self-checking balanced Differential Manchester code. For initialisation of the switch the clock signal is first provided only with inert data. For safety critical applications the clock signal is only enabled once the relevant safety interlocks (e.g. that the UAV is in flight, and that the fire supply is activated) are confirmed as present.

The received data bus signal 54 is taken via an isolating transformer 56 to a data extraction and power supply unit 58 where the data component is extracted from the encoded data signal. The data signal is also rectified and regulated to provide a local power supply 60 for a switching element 62 to which the extracted data 64 is supplied from the data extraction unit 58. The switching element 62 compares the keyword in the extracted data with its previously programmed-in keyword, and if they concur, the switching element commands a power switch 66 (e.g. a power transistor or a solid state relay) to close and supply main DC input power 68 to a switched power output 70. A feedback link 74 confirms to the switching element 62 that the power switch has closed.

The topology of a key-safe switch for use in the FIG. 5 embodiment is similar; the switching element in that case is configured to be addressable, and to receive and compare two or more keywords rather than to compare a received keyword with a keyword previously programmed into it.

Further, each key safe switch can include intelligent features e.g. user programmable switch-on period or single-shot operation.

For non-safety critical switching tasks, a single key safe switch may be used, instead of two or more in a cascaded or voting arrangement.

Although a common data bus 48 is preferred for reasons of simplicity and cost, more than one bus may be employed for greater integrity and availability, each serving a single switch or group of switches.

The invention also includes any novel feature or combination of features herein disclosed, whether or not specifically claimed.

The invention claimed is:

1. A control apparatus for triggering a safety-critical operation, the control apparatus comprising:
   a receiver for receiving control command signals from a remote operator; and
   a safety management system having a first part and at least one second part, said first part being responsive to a received
   control command signal to trigger operation of said at least one second part and thereby to trigger the safety-critical operation, wherein said first part transmits a plurality of keywords to said at least one second part in response to a received control command signal, and
   wherein said at least one second part comprises
   a plurality of key-safe switches, selectively responsive to the plurality of predetermined keywords, where each of said plurality of key-safe switches being configured to be activated upon receipt of a different respective one or more of the plurality of keywords, wherein the safety-critical operation is triggered in the event that at least a majority of said key-safe switches are activated.

2. The control apparatus of claim 1, wherein said first part and said at least one second part of the safety management system are implemented according to a relatively high level of integrity, and wherein the control apparatus further comprises a communications path, implemented according to a relatively low level of integrity, to convey the plurality of keywords from said first part to said at least one second part.

3. The control apparatus according to claim 2, wherein the communications path comprises a serial data bus.

4. The control apparatus according to claim 2, wherein the communications path is arranged to convey a combined data and power signal to each of said plurality of key-safe switches.

5. The control apparatus according to claim 1, wherein said plurality of key-safe switches are arranged in series with respect to a power supply or other executive signal for triggering the safety-critical operation.

6. The control apparatus according to claim 1, wherein said plurality of key-safe switches operate in a predetermined sequence.

7. The control apparatus according to claim 6, further comprising at least one logic gate configured such that a keyword is supplied to one of said plurality of key-safe switches via a logic gate to which an output from another of said plurality of key-safe switches is supplied, which causes said plurality of key-safe switches to operate in the predetermined sequence.

8. The control apparatus according to claim 1, wherein each of said plurality of key-safe switches is individually addressable.

9. The control apparatus according to claim 8, wherein the control command signals comprise an address for each of said plurality of key-safe switches and an associated one or more of said plurality of keywords and wherein said first part of said safety management system is configured to transmit each of said plurality of keywords to respectively addressed key-safe switches of said plurality of key-safe switches according to the control command signals.

10. The control apparatus according to claim 1, wherein said first part of said safety management system comprises a high integrity storage for storing said plurality of keywords and wherein said first part is configured to release said plurality of keywords from the storage for communication to said at least one second part upon receipt of a control command signal.

11. The control apparatus according to claim 10, wherein said plurality of keywords are stored in the high integrity storage in encrypted form and wherein the control command signal comprises a decryption key, and wherein said first part further comprises a processor for applying a predetermined decryption algorithm to said encrypted keywords using the decryption key, and wherein the results of said application of the decryption algorithm are communicated to said at least one second part.

12. The control apparatus according to claim 1, wherein the control command signals comprise said plurality of keywords and wherein said first part of said safety management system is configured to extract said plurality of keywords from the control command signals for communication to said at least one second part.

13. The control apparatus according to claim 12, wherein said first part of said safety management system is configured to transmit said plurality of keywords to said at least one second part of said safety management system in a sequence determined by the order in which they are received in the control command signals.

14. The control apparatus according to claim 1, wherein said receiver is configured to receive the control command signals from the remote operator over a communications path of relatively low integrity.

15. The control apparatus according to claim 1, wherein the control apparatus is configured for embodiment in an access control, power switching, or other form of safety-critical signalling or switching system.

16. An unmanned mobile or stationary platform or other form of autonomous or remotely controllable mobile or stationary platform carrying or associated with one or more weapon systems or other forms of countermeasure, the platform incorporating the control apparatus according to claim 1 configured to control the firing, launch or deployment of said one or more weapon systems or countermeasures.

* * * * *